United States Patent
Pelchen et al.

(10) Patent No.: US 7,247,115 B2
(45) Date of Patent: Jul. 24, 2007

(54) METHOD FOR CONTROLLING A DRIVETRAIN IN A MOTOR VEHICLE

(75) Inventors: Christoph Pelchen, Tettnang (DE); Detlef Baasch, Friedrichshafen (DE); Barbara Schmohl, Friedrichshafen (DE); Ünal Gazyakan, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 226 days.

(21) Appl. No.: 10/522,363

(22) PCT Filed: Aug. 18, 2003

(86) PCT No.: PCT/EP03/09104

§ 371 (c)(1),
(2), (4) Date: Jan. 26, 2005

(87) PCT Pub. No.: WO2004/018905

PCT Pub. Date: Mar. 4, 2004

(65) Prior Publication Data

US 2005/0274564 A1    Dec. 15, 2005

(30) Foreign Application Priority Data

Aug. 21, 2002  (DE) ............................... 102 38 127

(51) Int. Cl.
*F16H 31/00* (2006.01)
(52) U.S. Cl. ...................... 475/138; 477/107
(58) Field of Classification Search ............ 475/122, 475/123, 125, 126, 138; 477/107, 109; 74/339, 74/335

See application file for complete search history.

(56) References Cited

U.S. PATENT DOCUMENTS

| 4,677,879 A | | 7/1987 | Furusawa et al. |
| 5,522,777 A | * | 6/1996 | Baxter et al. ................. 477/36 |
| 5,588,935 A | * | 12/1996 | Osinski et al. .............. 477/107 |
| 5,613,401 A | | 3/1997 | Maurizio |
| 6,002,976 A | | 12/1999 | Hollstein et al. |
| 2002/0088291 A1 | * | 7/2002 | Bowen ........................ 74/339 |
| 2003/0228954 A1 | * | 12/2003 | Runde et al. ................ 477/107 |
| 2004/0220007 A1 | * | 11/2004 | Pelchen et al. ................. 475/5 |
| 2004/0220009 A1 | * | 11/2004 | Yu et al. ..................... 475/198 |

FOREIGN PATENT DOCUMENTS

| DE | 197 47 262 A1 | 5/1999 |
| DE | 199 56 527 A1 | 5/2000 |
| EP | 0 547 829 B1 | 11/1995 |
| EP | 0 595 496 B1 | 1/1998 |
| GB | 2 304 835 A | 3/1997 |

\* cited by examiner

*Primary Examiner*—Saul Rodriguez
*Assistant Examiner*—Justin K. Holmes
(74) *Attorney, Agent, or Firm*—Davis Bujold & Daniels, P.L.L.C.

(57) ABSTRACT

A method for controlling a drivetrain (1) in a motor vehicle is disclosed, in particular in an off-road vehicle with a drive unit (2), a multi-group transmission (4) and an output. The multi-group transmission (4) comprises at least an automatic gearbox (8) and a subsequent range transfer box (9) which may be switched by means of switching elements (24, 25). On changing the ratio in the range transfer box (9), a synchronisation of the switching element (24 or 25), for switching in the range transfer box (9), is carried out by means of a controller of switching elements in the automatic gearbox (8).

13 Claims, 9 Drawing Sheets

METHOD FOR CONTROLLING A DRIVETRAIN IN A MOTOR VEHICLE

This application is a national stage completion of PCT/EP2003/009104 filed Aug. 18. 2003 which claims priority from German Application Serial No. 102 38 127.5 filed Aug. 21. 2002.

FIELD OF THE INVENTION

The invention concerns a method for controlling the drivetrain in a vehicle.

BACKGROUND OF THE INVENTION

From prior practice drivetrains of vehicles, in particular off-road vehicles, are known, which comprise a drive engine, a multi-range transmission and a drive output. The incorporation of a multi-range transmission enables several gear speeds to be made available with the fewest possible gear wheel pairings.

In practice, a multi-range transmission consists of a combination of several transmission units, such as a so-termed upstream reduction gear group, a main transmission and a downstream group or range transfer box. To provide good shifting comfort and as many speed shifts as possible, the main transmission is preferably made as an automatic transmission, for example with six forward speeds and one reverse. The combination of such an automatic transmission with a range transfer box downstream therefrom extends the gear-speed sequence of a multi-range transmission consisting of a main transmission and a range transfer box.

As a transmission unit, a range transfer box is characterized in that an input rotation speed of the range transfer box is always converted to "slow". Moreover, it is characteristic of a range transfer box that in the range transfer box a torque increase takes place so that vehicles or off-road vehicles can still be driven even on steep slopes. Owing to the large torque increase, range transfer boxes are always connected downstream from a main transmission, which avoids the transfer of high torques through the main transmission itself.

In practice, range transfer boxes are made as reduction gear systems or compact planetary gear sets. The transmission ratio in a range transfer box is changed by way of shift elements with which the ratio is shifted between a first range ("low") and a second range ("high"). When the first ("low") range is engaged in the range transfer box in combination with the main transmission, this provides the driver with a transmission ratio range that is advantageous for the operation of a vehicle on land with steep slopes at low vehicle speeds.

The second ("high") transmission range of the range transfer box is less affected by losses, so that when driving over normal territory and also at higher driving speeds the second ("high") range is preferably engaged in the range transfer box.

When shifting between the two transmission ranges "low" and "high" of the range transfer box, synchronization of the shift elements of the range transfer box to be engaged for the respective "low" or "high" range desired is necessary, since owing to the large ratio change in the range transfer box between shift elements to be disengaged and ones to be engaged, large differential rotation speeds exist. These speed differences are equalized by suitable synchronization means, which in the range transfer box can either be made as separate components or integrated in the shift elements of the range transfer box. In the latter case, the shift elements are usually made as frictional disk clutches or disk brakes.

This has the disadvantage, however, that range transfer boxes constructed with separate mechanical synchronization means or with frictional shift elements comprise large components and take up a lot of structural space, since they have to be made appropriately robust because of the high stressing of the components during synchronization. Furthermore, separate mechanical synchronization means or frictional shift elements incur high manufacturing costs, and this is uneconomical.

Accordingly, the purpose of the present invention is to provide a method for controlling the drive train of a vehicle with which the transmission ratio of a range transfer box can be changed by way of a more compact and less costly structure.

SUMMARY OF THE INVENTION

When a transmission ratio of the range transfer box is changed, synchronization of a shift element of the range transfer box to be engaged is carried out by the control of shift elements of the automatic transmission; in an advantageous way, there is no longer any need for mechanical synchronization means to be provided in the range transfer box itself—whether as separate components or integrated in shift elements of the range transfer box. This makes it possible to construct a range transfer box which is of considerably simpler design compared with the multi-range transmissions known from the prior art, such that the range transfer box takes up less structural space.

Furthermore, synchronization of the range transfer box by the automatic transmission, when the transmission ratio of the range transfer box is changed, offers the advantage that shift elements of the range transfer box can be made as positive interlocking shift elements, preferably as claw-type clutches, by way of which high torques can be transferred but which take up little structural space and incur low manufacturing costs.

In addition, it is advantageous that the omission of mechanical synchronization means in the range transfer box reduces drag torques of opened mechanical synchronization means and the evolution of heat in the range transfer box is substantially reduced. Drag torques occur in mechanical synchronization systems essentially because of the fluid friction that takes place between the friction linings of frictional clutches or brakes, caused by oil.

A further substantial advantage of the method according to the invention, is that owing to the synchronization of the range transfer box by the automatic transmission, the traction force interruption time is considerably reduced compared with the methods known from prior practice, since a drive input speed of a drive engine can be changed as necessary by appropriate actuation of shift elements of the automatic transmission, in a simple manner and in a short time.

BRIEF DESCRIPTION OF THE DRAWINGS

The invention will now be described, by way of example, with reference to the, accompanying drawings in which.

DETAILED DESCRIPTION OF THE INVENTION

Figure 1:
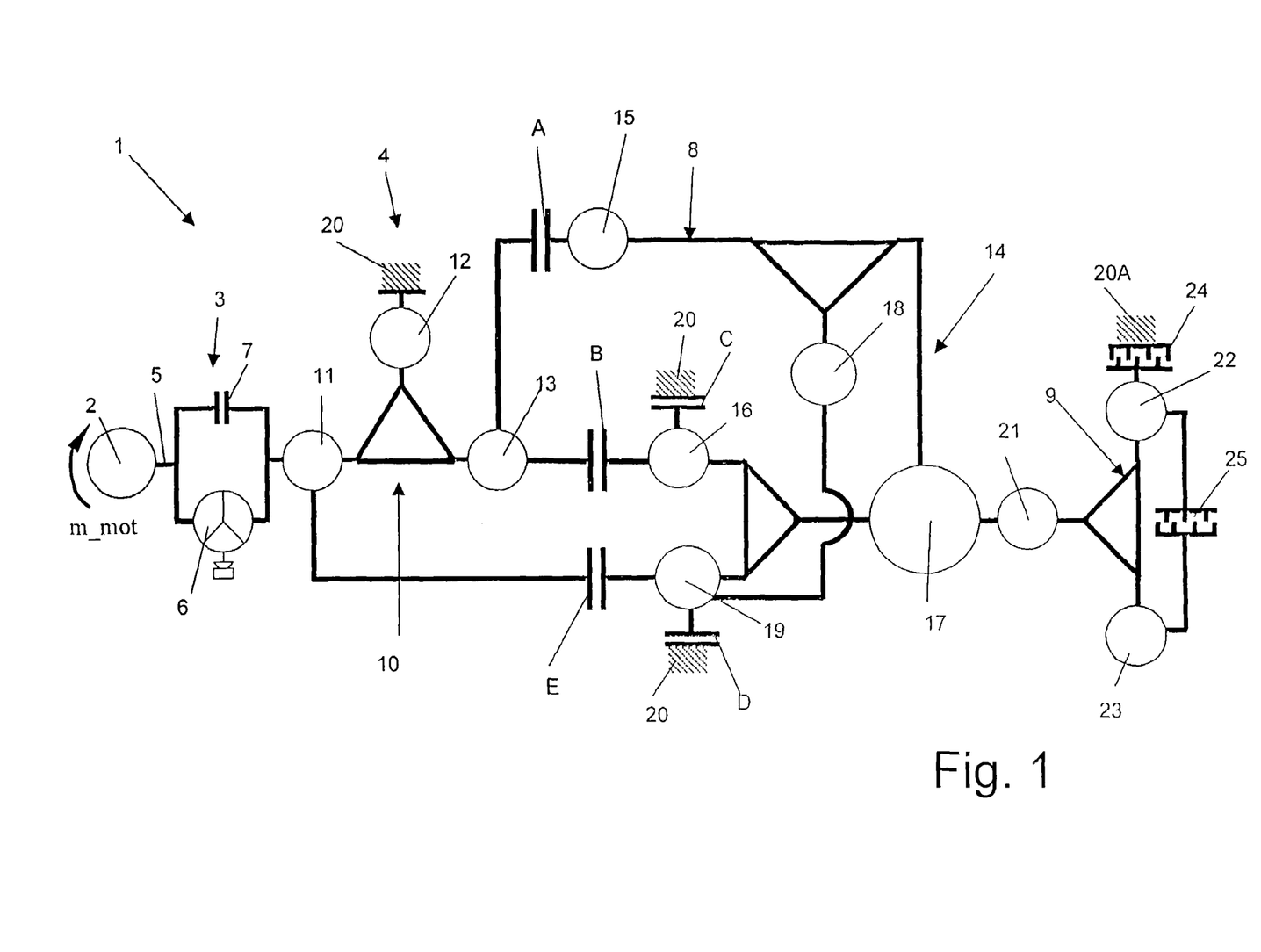
FIG. 1 is a schematic representation of a drivetrain with a drive engine, a starting element and a multi-range transmission consisting of an automatic transmission and a range transfer box.

Referring to FIG. 1, a drivetrain 1 of a vehicle (of which no more is shown), in particular an off-road vehicle, is represented very schematically. In this case, the drivetrain 1 consists of a drive engine 2, a starting element 3 and a multi-range transmission 4. The drive engine 2 is an internal combustion engine whose drive torque m_mot is transferred via an output shaft 5 to the starting element 3 made with a hydrodynamic torque converter 6. In addition, the starting element 3 is formed with a converter clutch 7, with which the hydrodynamic torque converter can be bypassed.

The multi-range transmission 4 connected in series downstream from the starting element 3 is, in this case, formed by an automatic transmission 8 and a downstream range transfer box 9; the automatic transmission 8 constituting the main gear system of the multi-range transmission 4.

This gear combination of the present multi-range transmission 4 consists of the change-under-load automatic transmission 8 and a claw-actuated transmission group with a reduction step, namely, the automatically actuated range transfer box 9. This transmission combination is provided with an electronic control system consisting of an automatic transmission control unit, a range transfer box control unit and an engine control unit.

These three control units (not shown) are interlinked and exchange between them the signals required for the control of the drivetrain 1. By virtue of the coordinated control of the automatic transmission 8 and the range transfer box 9, the claw-actuated range transfer box 9 is synchronized via the automatic transmission 8 during a ratio change in the range transfer box 9. The synchronization of the range transfer box 9 or its respective shift elements to be engaged takes place by appropriate control of shift elements A to E of the automatic transmission 8.

The automatic transmission 8 comprises a first planetary gear set 10, an annular gear wheel 11 of this first planetary gear set 10 being connected to the starting element 3. Several planetary gears roll between the annular gear wheel 11 and a solar gear wheel 12 of the first planetary gear set 10 and are mounted to rotate on a planetary gear wheel support 13. The planetary gear wheel support 13 of the first planetary gear set 10 is connected to a shift element A and a shift element B, the shift elements A and B being in the form of frictional disk clutches.

The annular gear wheel 11 of the first planetary gear set 10 is connected to a shift element E formed as a frictional disk clutch. Via the shift elements A, B and E, a connection can be produced between the first planetary gear set 10 and a second planetary gear set 14 formed as a double planetary gear set, the latter corresponding essentially to a Ravigneaux planetary gear set.

The second planetary gear set 14 comprises a first solar gear wheel 15 and a second solar gear wheel 16, such that between the first solar gear wheel 15 and a common annular gear wheel 17, and between the second solar gear wheel 16 and the common annular gear wheel 17 in each case several planetary gears run, which are mounted to rotate on a first planetary gear support 18 or a second planetary gear support 19 of the second planetary gear set 14.

The solar gear wheel 12 of the first planetary gear set 10 is set in a fixed position in a transmission housing 20 of the automatic transmission 8. The second solar gear wheel 16 of the second planetary gear set 14 is preferably connected to the transmission housing 20 via a shift element C made as a frictional disk clutch. Furthermore, the second planetary gear support 19 of the second planetary gear set 14 can be connected via a shift element D made as a frictional disk brake to a component arranged in a fixed position in the transmission housing 20 or to the transmission housing 20 itself.

The common annular gear wheel 17 of the second planetary gear set 14 is connected to a solar gear wheel 21 of the range transfer box 9, and between the solar gear wheel 21 and an annular gear wheel 22 of the range transfer box 9 run several planetary gears, which are mounted to rotate in a planetary gear support 23 of the range transfer box 9; this, in turn, being connected to the drive output.

To produce a first, "low" range of the range transfer box 9, the annular gear wheel 22 of the range transfer box 9 can be connected to a transmission housing 20A of the range transfer box 9 by way of a first shift element 24, so that the annular gear wheel 22 is connected to the housing 20A of the range transfer box 9 and cannot rotate. A second, "high" range of the range transfer box 9 is then engaged if the first shift element 24 is opened or disengaged, and a second shift element 25 of the range transfer box 9 arranged between the annular gear wheel 22 and the planetary gear support 23 is closed, so connecting the annular gear wheel 22 to the planetary gear support 23.

Figures 2, 3:
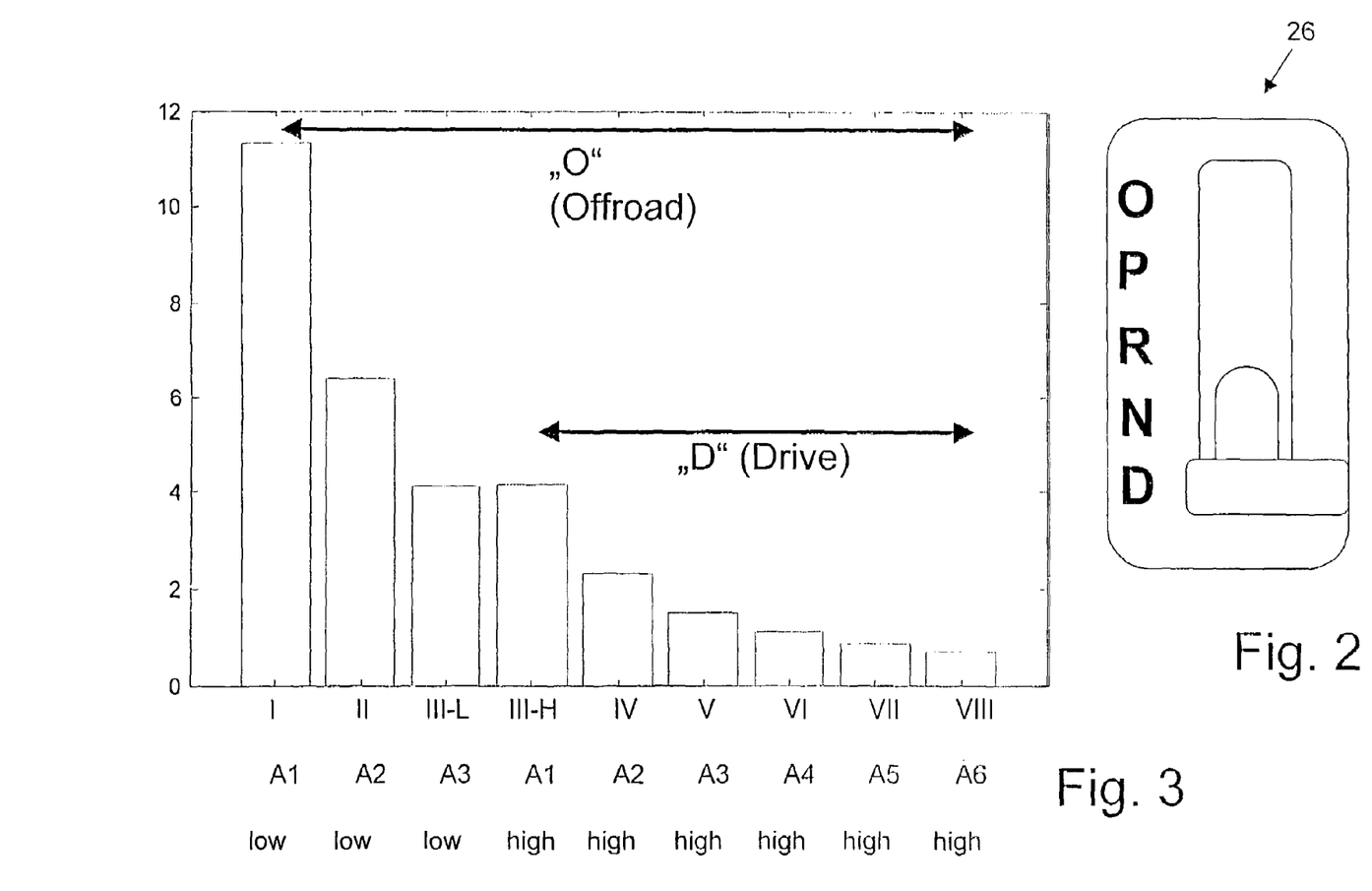
FIG. 2 is a schematic representation of an automatic transmission selector lever, having an off-road position.
FIG. 3 is a bar diagram in which transmission ratios of a multi-range transmission are shown as a function of transmission ratios of an automatic transmission and a range transfer box.

By way of an automatic transmission selector lever 26 illustrated in FIG. 2, a driver can select various modes. For this, various positions "O", "P", "R", "N" and "D" of the automatic transmission selector lever 26 are possible, which are recognizably separated from one another for the driver by a click-stop system. In the "O" (Off-road) and the "D" (Drive) positions of the automatic transmission selector lever 26, in each case the driving direction of the vehicle selected is "Forward". The "P" (Park) position is engaged when the vehicle is stationary, the drive output of the vehicle then being blocked. The "R" (Reverse") position is selected in order to engage a reverse gear and, in the "N" (Neutral) position, the force flow of the drivetrain 1 from the engine 2 to the vehicle's drive output is interrupted in the area of the multi-range transmission 4.

The positions "O" and "D" or the associated functions of the automatic transmission selector lever 26 for forward driving differ in that when the selector lever is in position "D" the "high" range is engaged in the range transfer box 9 and, as shown in FIG. 3, six speeds of the multi-range transmission 4 are available for driving, namely "III-H", "IV", "V", "VI", "VII" and "VIII", depending on a ratio "A1", "A2", "A3", "A4", "A5" or "A6" of the automatic transmission 8. The overall transmission ratio of the multi-range transmission 4 then adopts values in a range, for example, of 4.17 to 0.69.

A shift between the individual speeds "III-H", "IV", "V", "VI", "VII" and "VIII" of the multi-range transmission 4 takes place in each case by changing the ratio of the automatic transmission 8, which preferably takes place in accordance with a specified or selected shifting program, for example, a program stored in the control unit of the multi-range transmission 4 or of the automatic transmission 8.

If a driver selects position "O" using the automatic transmission selector lever 26, apart from the speeds "III-H", "IV", "V", "VI", "VII" and "VIII" three further gear-steps "I", "II" and "III-L" can be engaged via the multi-range transmission 4. The gears "I", "II" and "III-L" are only available when the "low" range is set in the range transfer box 9 and, in the automatic transmission 8, a respective first ratio "A1", a second ratio "A2" or a third ratio "A3" is engaged. The transmission ratio of the multi-range transmission 4 then adopts values between, for example, 11.3 and 0.69.

Furthermore, when the automatic transmission selector lever 26 is in the "O" position, a change of the range of the range transfer box 9 from "low" to "high" takes place automatically at a certain operating point of the drivetrain as a result of an operating strategy which is superimposed over whichever shift program is activated. At the same time, in the automatic transmission the ratio "A3" is shifted to ratio "A1". The shift processes of the multi-range transmission 4 are carried out fully automatically by appropriate control of the automatic transmission 8 and the range transfer box 9, making things easier for the driver of the vehicle.

Moreover, the selection of the "low" or "high" range in the range transfer box 9 is carried out by the above-mentioned superimposed operating strategy in such manner that "senseless" ratio combinations of the automatic transmission 8 and the range transfer box 9 are prevented.

"Senseless" transmission ratio combinations are understood to be combinations of the individual ratios of the automatic transmission 8 and the range transfer box 9 in which there are very large rotation speed differences between the automatic transmission 8 and the range transfer box 9. This is so, for example, when "low" is engaged in the range transfer box 9 and the ratio "A5" has to be engaged in the automatic transmission 8 in order to establish a transmission ratio of the multi-range transmission 4 called for by the shift program.

Since in a combination of a "small" ratio of the automatic transmission 8 with the "low" range of the range transfer box 9 very high input speeds occur in the latter, which result in low efficiency of the multi-range transmission 4, to produce a required ratio of the multi-range transmission 4 the range in the range transfer box 9 is changed from "low" to "high" and a "larger" ratio is automatically engaged in the automatic transmission to produce the required ratio of the multi-range transmission 4. This reduces the input speed of the range transfer box 9 and the range transfer box 9 is operated in "high", which considerably improves the efficiency of the multi-range transmission 4. This, in turn, leads to reduced heat production in the range transfer box 9 and to reduction of the fuel consumption of the vehicle or its engine 2.

To carry out a shift or range change of the range transfer box 9 with the shortest possible traction force interruption time, the change is carried out during very well-defined operating conditions of the multi-range transmission 4 or drivetrain 1.

FIG. 3 shows a bar diagram in which the height of the bars indicates a quantitative value of the transmission ratio of the multi-range transmission 4. The ratio of the multi-range transmission 4 is determined in each case by the combination of the transmission ratios of the automatic transmission 8 and of the range transfer box 9, and corresponds respectively to the various speeds "I", "II", "III-L", "III-H", "IV", "V", "VI", "VII" and "VIII" of the multi-range transmission 4.

In this, it is significant that thanks to an appropriate progression in the automatic transmission 8 and the range transfer box 9, the ratios of the gear-steps "III-L" and "III-H" of the multi-range transmission 4 are approximately equal. Like all the other gear-steps of the multi-range transmission 4, so too the steps "III-L" and "III-H" are set by a particular combination of the ratios of the automatic transmission 8 and the range transfer box 9. In step "III-L" of the multi-range transmission 4, the ratio "A3" is engaged in the automatic transmission 8 and, at the same time, the "low" range is engaged in the range transfer box 9. In contrast, in step "III-H" of the multi-range transmission 4 the ratio "A1" is engaged in the automatic transmission 8 and the "high" range is engaged in the range transfer box 9.

Figure 4:
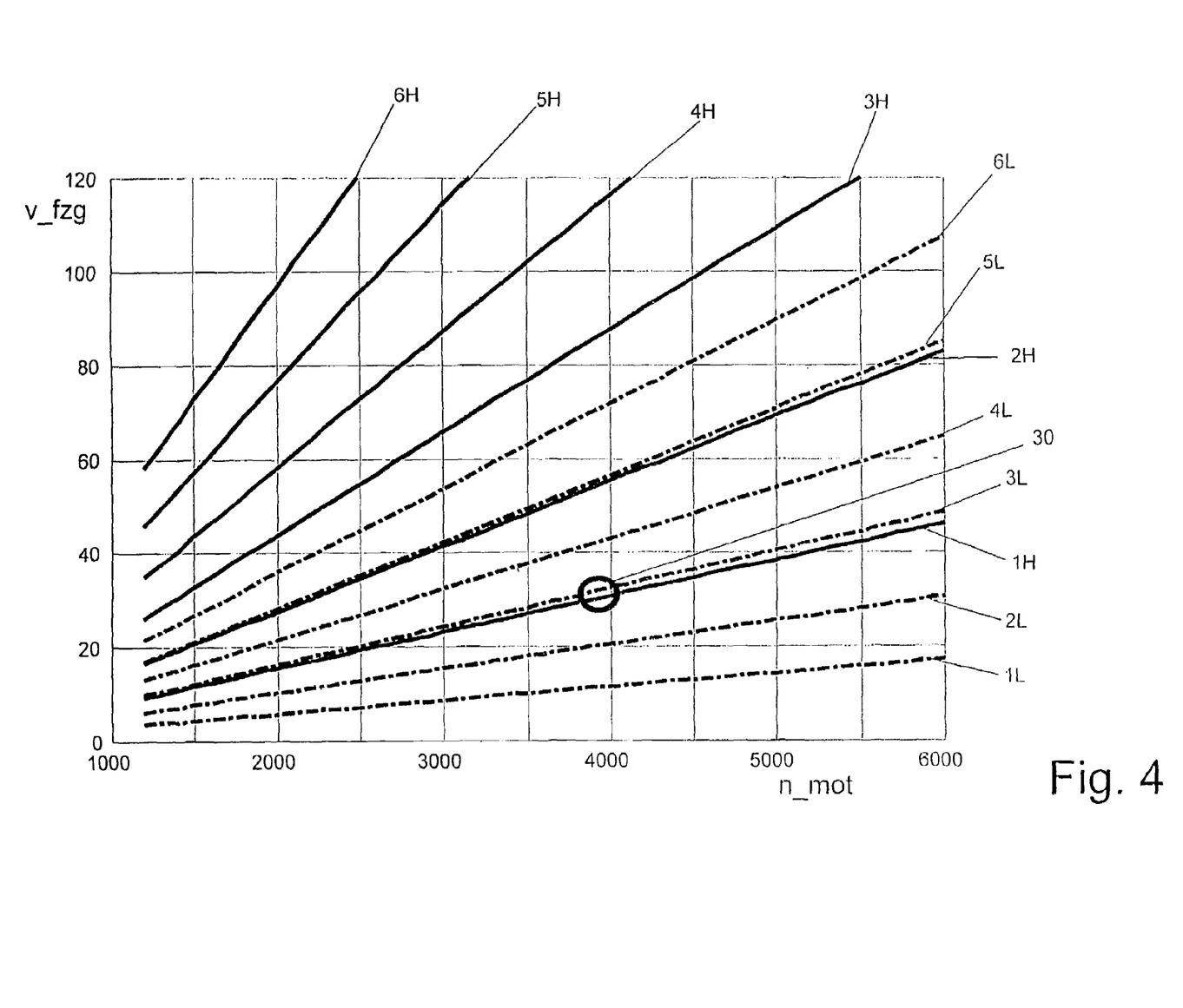
FIG. 4 is a diagram showing, in each case, a variation of vehicle speed as a function of the rotation speed of a drive engine for individual gear-steps of the multiple-range transmission of FIG. 3.

When position "O" of the automatic transmission selector lever 26 is selected in the presence of a given operating condition, a shift takes place in the range transfer box 9 from "low" to "high" range or vice-versa. In FIG. 4, an example of this operating condition is denoted by a circle 30.

Since the transmission ratio of the multi-range transmission 4 in gear-steps "III-L" and "III-H" is almost the same, the variations of vehicle speed v_fzg, plotted in FIG. 4 as a function of the speed n_mot of the drive engine 2, are almost identical. At a given vehicle speed v_fzg a rotation speed n_mot of the engine 2 when in gear-step "III-L", is approximately the same as the speed n_mot of the engine 2 in gear-step "III-H" or vice-versa.

If the transmission range in the range transfer box 9 is changed from "low" to "high" in this operating condition of the drivetrain 1, this range change can be carried out with a very short traction force interruption time since, during the range change in the range transfer box 9, the speed n_mot of the engine 2 remains virtually the same and only transmission-internal rotating masses in the multi-range transmission 4 have to be synchronized with one another.

FIG. 4 shows a rotation speed-vehicle speed diagram in which the lines represent a variation of vehicle speed v_fzg with the speed n_mot of the engine 2 for the various ratios of the multi-range transmission 4. The ratios of the multi-range transmission 4 are in each case determined by a combination of the ratios of the automatic transmission 8 and of the range transfer box 9 with its two range steps.

The individual variations are in each case characterized by the letter "A" and a number "1" to "6", which together indicate the ratio engaged in the automatic transmission 8. In addition, the number is followed by one of the letters "H" or "L", respectively, representing the "high" and "low" ranges of the range transfer box 9.

For example, the designation "A2H" means that the variation of the vehicle speed v_fzg it denotes is produced by a transmission ratio of the multi-range transmission 4 obtained by a combination of the second ratio "A2" of the automatic transmission 8 and the "high" range of the range transfer box 9, and which corresponds to gear-step "IV" of the multi-range transmission 4.

The engine speed-vehicle speed diagram of FIG. 4 shows that the variations of the vehicle speed v_fzg with the speed n_mot of the engine 2 are nearly identical when the ratio "A3" is engaged in the automatic transmission and at the same time the "low" range is engaged in the range transfer box or when the ratio "A1" is engaged in the automatic transmission 8 and, at the same time, the "high" range is engaged in the range transfer box 9.

Knowing this, it is apparent in combination with the representation in FIG. 3 that changing the transmission range in the range transfer box from "low" to "high" or from "high" to "low" is particularly advantageous when, at the same time, the ratio in the automatic transmission is changed from "A3" to "A1" or vice-versa, respectively. The ratio of the multi-range transmission 4 remains substantially the same during this and, accordingly, a connection value of the rotation speed of the drive engine 2 in the desired ratio of the multi-range transmission 4, at which the range transfer box 9 is synchronized, is essentially the same as the speed of the engine 2 in the multi-range transmission ratio currently engaged.

This means that on shifting the range of the range transfer box 9, no adaptation of the speed of the engine 2 takes place and synchronization of the shift elements of the range transfer box 9 and those of the automatic transmission 8 to be shifted can take place independently of the engine speed and in a very short time, preferably in a range of 0.1 to 0.2 and, in particular, in about 0.15 seconds.

This represents a considerably shorter traction force interruption time compared with conventional shift strategies known from the prior art, which result in shift times of half a second to one second corresponding to a considerable traction force interruption.

The variations "A5L" and "A2H" of the engine speed-vehicle speed diagram in FIG. 4 are also nearly identical. However, the transmission ratio combination of the automatic transmission 8 ratio "A5" and the range transfer box 9 range "low" to produce the multi-range transmission 4 ratio is not selected by the operation strategy stored in the control unit and superimposed over the respectively activated shift program, because of the above-mentioned negative effects.

It is, of course, within the discretion of those with knowledge of the subject, to carry out a range change in the range transfer box 9 depending on the application situation in each case, in such manner that the change between the "low" and "high" ranges of the range transfer box 9 is effected, in particular, when the ratio "A5" or "A2" is engaged in the automatic transmission 8 and, in accordance with the range change in the range transfer box 9, the ratio "A2" in the automatic transmission 8 is shifted to "A5" or vice-versa.

Figure 5:
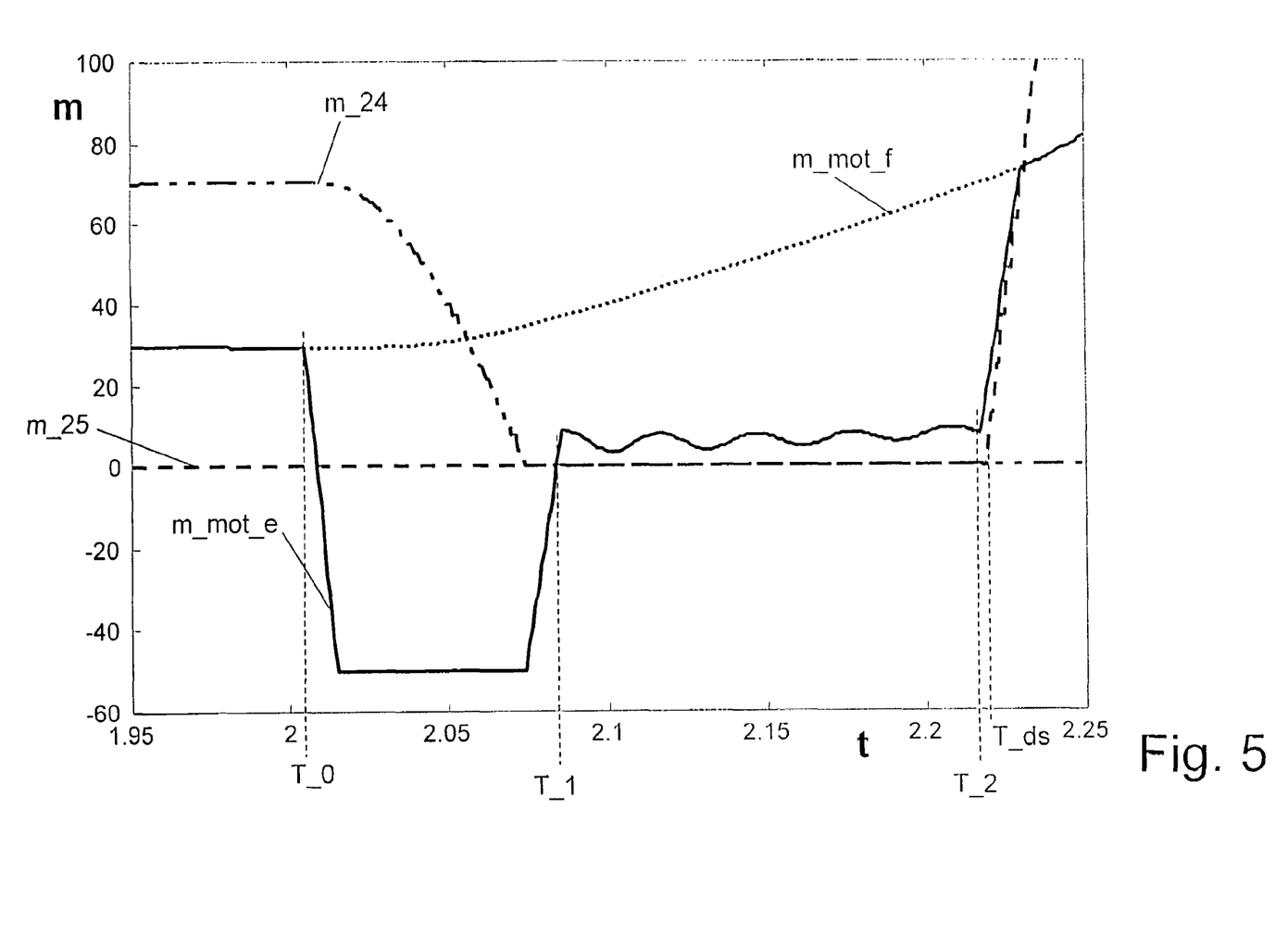
FIG. 5 are several variations of the torques imposed on components of the drivetrain of FIG. 1 during a transmission ratio change in the range transfer box of the multi-range transmission.

FIG. 5 shows several variations of torque with shifting time t during a change of the transmission ratio of the range transfer box 9 from "low" to "high". Here, a line m_24 represents the variation of the torque on the first shift element 24 of the range transfer box 9 during the shift in the range transfer box 9. A line m_25 represents the torque on the second shift element 25 of the range transfer box 9 during the ratio change of the range transfer box 9 from "low" to "high" range.

To this corresponds a variation m_mot_e of the drive engine 2, which represents a specification from the control unit and is known as the so-termed E-Gas-Moment. The E-Gas-Moment m_mot_e is the drive torque applied on the engine side by the engine to the multi-range transmission 4 during the shift, as regulated by the control unit. In addition a line m_mot_f is shown, which represents the variation of a drive torque of the engine 2 called for by a driver, but which is not taken into account during the transmission ratio change in the range transfer box 9.

In accordance with the superimposed operating strategy stored in the control unit, if a signal is emitted that a shift should take place in the range transfer box 9 from "low" to "high" range, the drive torque of the engine 2 is changed in accordance with the variation m_mot_e of the E-Gas-Moment to relieve the load in the drivetrain 1 until the first shift element 24, made as a claw clutch, is completely unburdened in accordance with the line m_24.

Then the E-Gas-Moment m_mot_e, which is held constant until the first shift element 24 has been fully unburdened, is changed in the direction of a positive value. Thereafter, the E-Gas-Moment n_mot_e is regulated to a certain value until the final shifting of the second shift element 25 of the range transfer box 9 also made as a claw clutch, which supports the synchronization of the second shift element 25.

From a time T_ds, i.e., the time when the second shift element 25 is shifted, the torque or the line m_25 representing the torque of the second shift element 25 increases abruptly and this establishes the force flow between the engine 2 and the drive output of the vehicle. At the same time, the E-Gas-Moment m_mot_e is adapted to the driver torque m_mot_f, and this terminates the shifting process or range change in the range transfer box 9.

Figure 6:
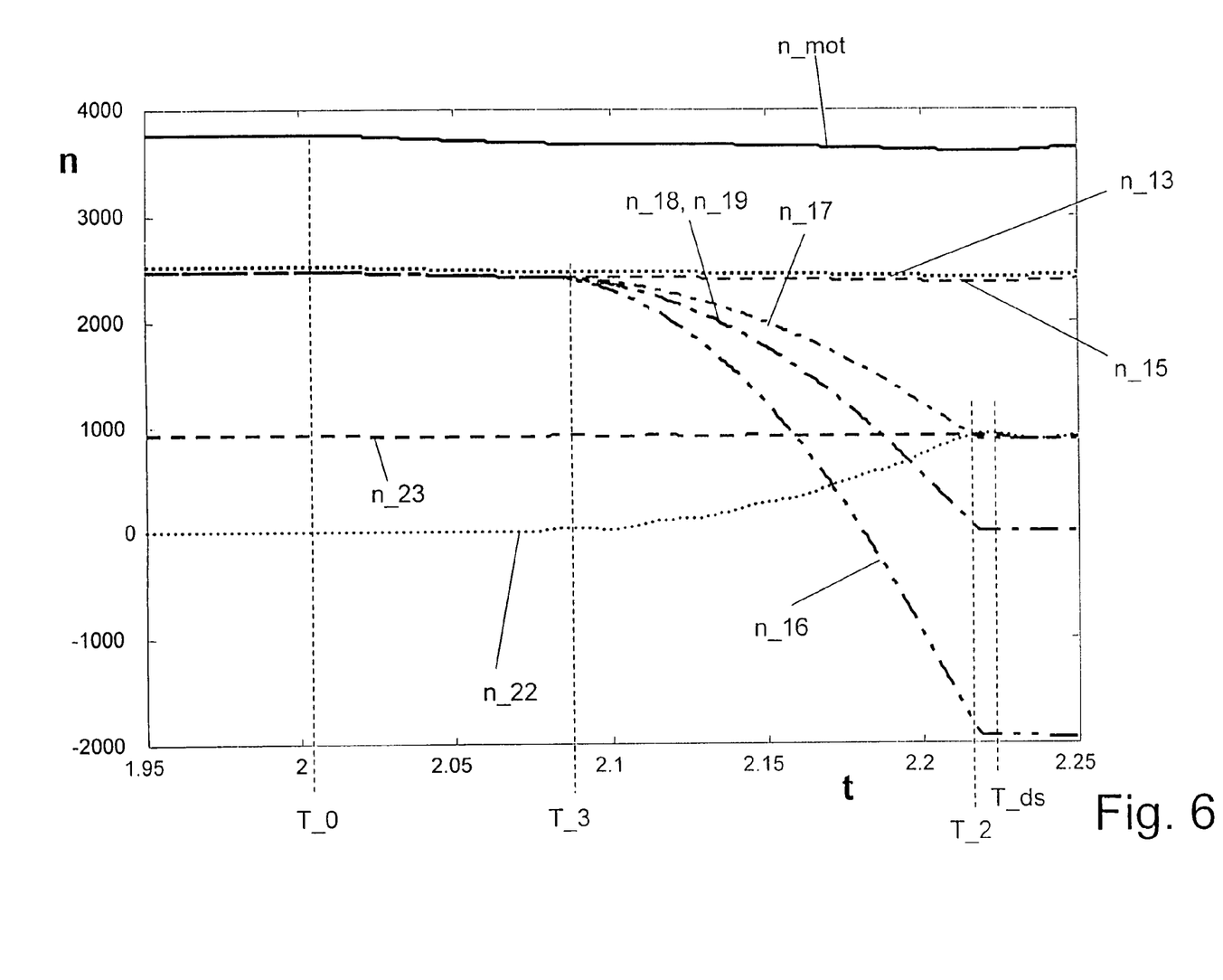
FIG. 6 is a rotation speed-time diagram with several variations that correspond to the torque variations shown in FIG. 5.

The diagram of FIG. 6, which shows several rotation speed variations of various structural elements of the drivetrain 1 according to FIG. 1 during a shift in the range transfer box 9 and automatic transmission 8, illustrates the synchronization of the range transfer box 9 by the automatic transmission or its shift elements A to E in greater detail. In the Figure, the speeds n are plotted as a function of the shifting time t.

The various rotation speed variations of the individual components of the drivetrain 1 are, in each case, denoted by the letter n and the indexes of the corresponding components of the drivetrain 1 of FIG. 1. For example, the line n is the speed variation of the planetary gear support 13 of the first planetary gear set 10.

At time T_0, when the shifting phase of the range change in the range transfer box 9 begins, the E-Gas-Moment m_mot_e is changed in accordance with the variation shown in FIG. 5. This measure, which is initiated by the control unit, at first has no influence on the rotation speed variations n_13, n_15, n_16, n_17, n_18, n_19, n_22, n_23 shown in FIG. 6 and on the variation of the engine speed n_mot of the drive engine 2. With increasing shift time t the torque m_24 of the first shift element 24 of the range transfer box 9 is reduced to zero and the first shift element 24 of the range transfer box 9 is opened.

This means that the annular gear wheel 22 of the range transfer box 9 is released from the transmission housing 20A of the range transfer box 9 and is then able to turn. From that time onwards, the speed n_22 of the annular gear wheel 22 of the range transfer box 9 increases slowly toward the speed n_23 of the planetary gear support 23 of the range transfer box 9.

From a time T_3 onwards, the transmitting capability of shift elements of the automatic transmission 8 to be engaged and disengaged is adjusted in such manner that the rotation speed n_16 of the second solar gear wheel 16 of the second planetary gear set 14, the rotation speed n_17 of the common annular gear wheel 17 of the second planetary gear set 14, the speed n_18 of the first planetary gear support 18 of the second planetary gear set 14 and the speed n_19 of the second planetary gear support 19 of the second planetary gear set 14 are reduced. During this the speed n_13 of the planetary gear support 13 of the first planetary gear set 10, the speed n_15 of the first solar gear wheel of the second planetary gear set 14 and the drive speed n_mot of the engine 2 remain essentially almost unchanged.

In combination with the specification of the E-Gas-Moment m_mot_e, the control of the transmitting capability of the shift elements of the automatic transmission results in an approximation of the speed n_22 of the annular gear wheel 22 of the range transfer box 9 to the speed n_23, until the speeds n_2 and n_23 are identical. At this point, the second shift element 25 of the range transfer box 9 is synchronized and can be engaged or closed. The point in question is shown as time T_2 in FIG. 6.

At time T_ds a position sensor detects the engagement of the second shift element 25 of the range transfer box 9 and the E-Gas-Moment m_mot_e is equalized with the driver-specified torque m_mot_f.

The diagrams of FIGS. 7 to 11 correspond essentially to those of FIGS. 2 to 6, respectively. With reference to FIGS. 7 to 11, the behavior of individual operating parameters of the drivetrain 1 of FIG. 1 during the transmission ratio changes of the automatic transmission 8 and the range transfer box 9 is described below, the control of the drivetrain 1, however, corresponding to a version of the method according to the invention alternative to the version described with reference to FIGS. 2 to 6. In the description relating to FIGS. 7 to 11, for the sake of clarity components with the same structure and function are indexed in the same way as in the description relating to FIGS. 2 to 6.

Figure 7:
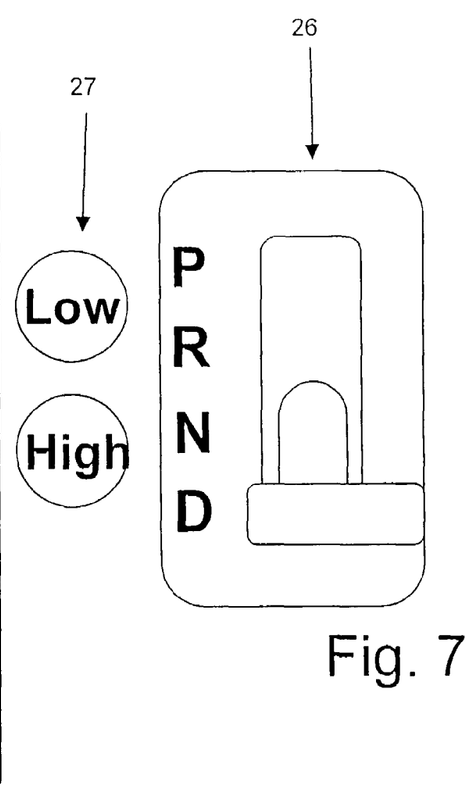
FIG. 7 is another example embodiment of an automatic transmission selector lever, which is combined with a selection switch for the preselection of a transmission range in the range transfer box.

FIG. 7 shows an automatic transmission selector lever 26 with selector lever positions "D", "N", "R" and "P". A selector switch 27 enabling the driver to specify the ranges "low" and "high" in the range transfer box 9 is combined with the automatic transmission selector lever 26. The selector switch 27 is coupled with the control unit of the drivetrain 1 in such manner that when the driver's wish is specified by means of the selector switch 27, the respective range "low" or "high" is engaged in the range transfer box 9.

Figure 8:
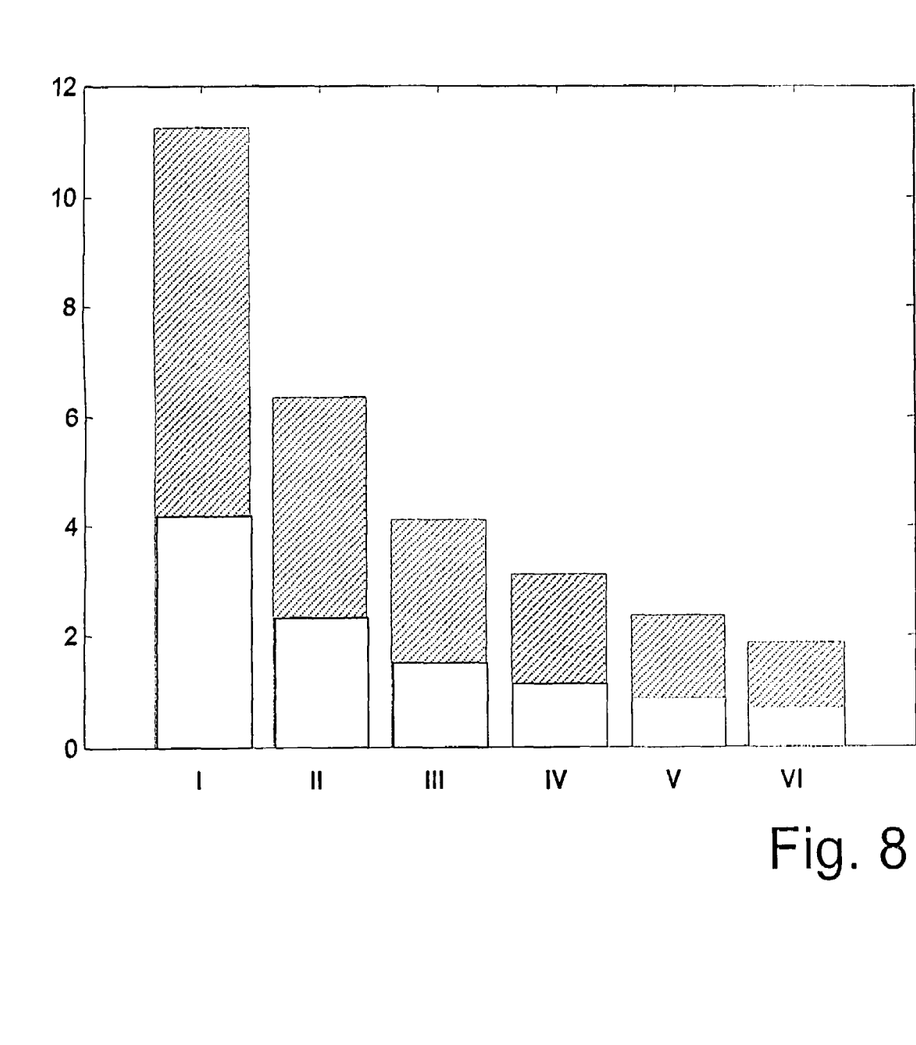
FIG. 8 is a bar diagram showing various gear-steps of a multi-group transmission that can be controlled by means of the automatic transmission selector lever and selector switch according to FIG. 7.

Depending on the range engaged in the range transfer box 9, the individual gear-steps "I", "II", "III", "N", "IV", "V" and "VI" of the multi-range transmission 4 produce the transmission ratios indicated by the bar diagram of FIG. 8. The total height of a bar corresponds in each case to a ratio of the individual gear-step "I", "II", "III", "N", "IV", "V" and "VI" of the multi-range transmission 4 when the "low" range is engaged in the range transfer box 9. The individual steps "I", "II", "III", "N", "IV", "V" and "VI" of the multi-range transmission 4 are respectively engaged by means of a corresponding ratio change of the automatic transmission, such that the respective transmission ratios of the steps "I", "II", "III", "N", "IV", "V" and "VI" of the multi-range transmission depend on the range engaged in the range transfer box.

If the "low" range is engaged in the range transfer box 9, the ratio values obtained for the individual gear steps "I", "II", "III", "IV", "V" and "VI" of the multi-range transmission 4 are shown by the shaded bars. In other words, with the range transfer box 9 in "low" the multi-range transmission 4 has six speeds whose transmission ratios have values, for example, between 11.3 and 1.87. If "high" is engaged in the range transfer box 9, the multi-range transmission 4 also has six speeds, whose ratios have values for example between 4.17 and 0.69.

Figure 9:
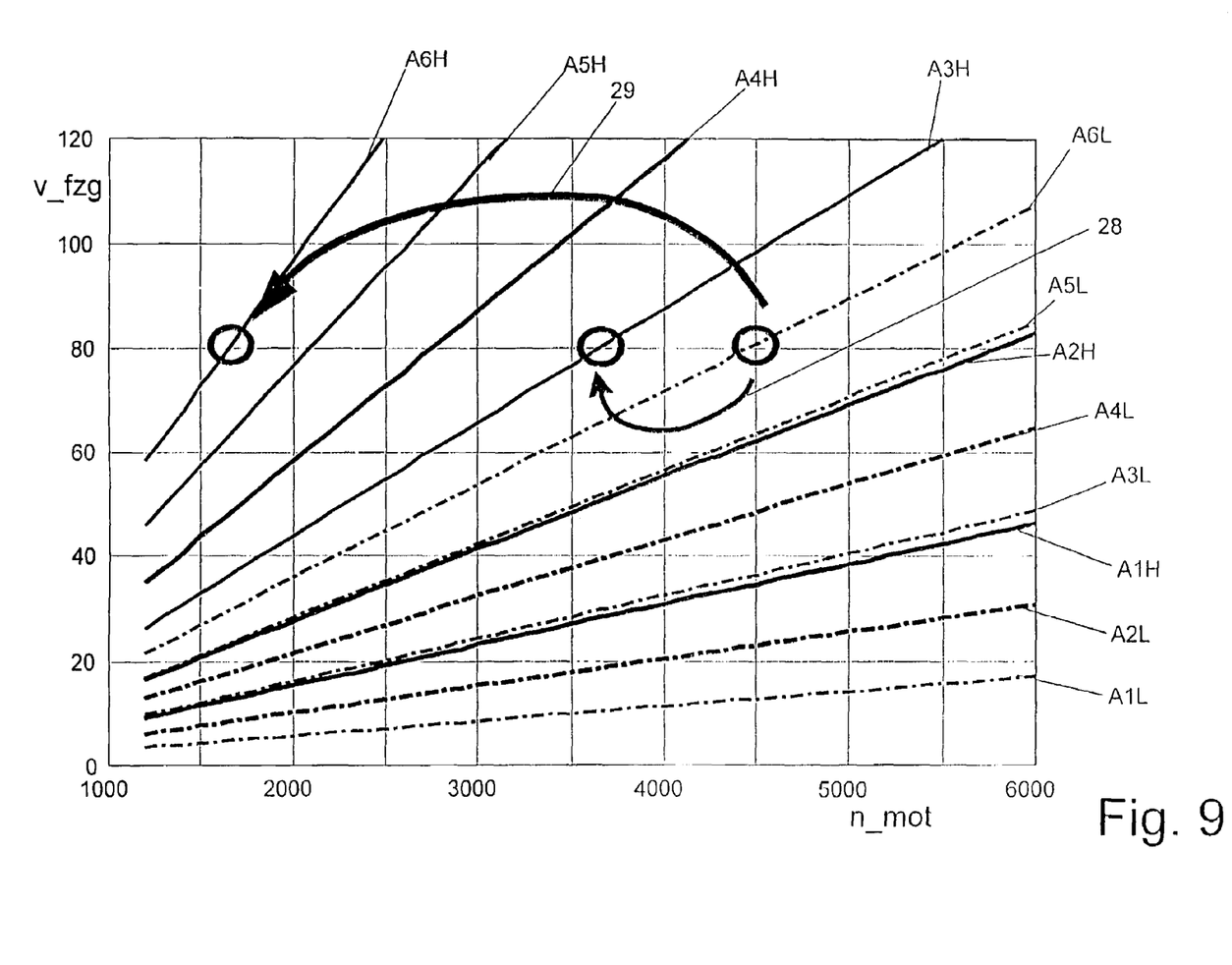
FIG. 9 is a diagram showing, for individual gear-steps of the multi-range transmission of FIG. 8, in each case a variation of a vehicle speed as a function of the rotation speed of a drive engine.
Figure 10:
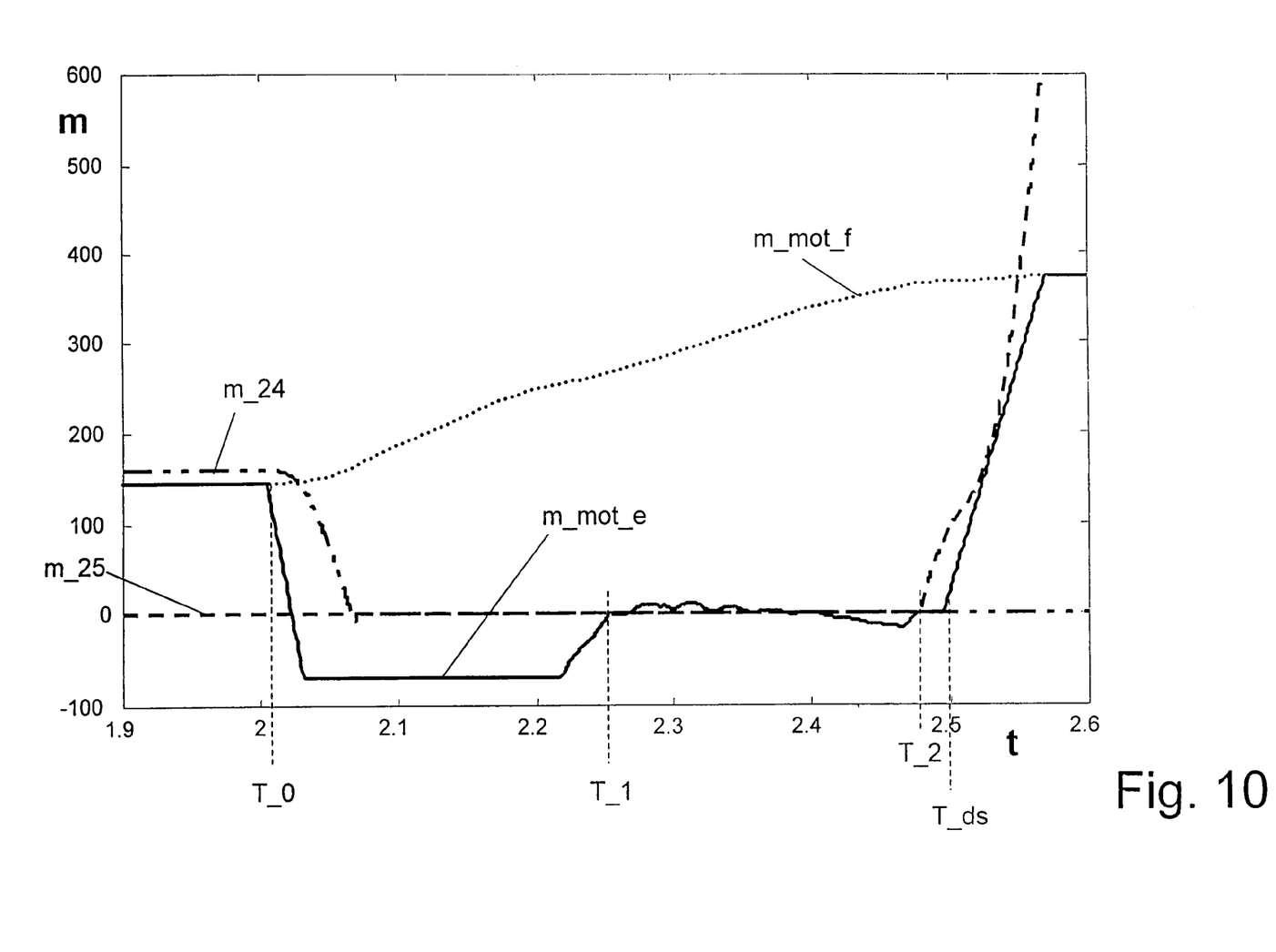
FIG. 10 are several variations of the torques imposed on the drivetrain of FIG. 1 during the transmission ratio change represented schematically in FIG. 9 in the range transfer box of the multi-range transmission.

FIG. 9 shows an engine speed-vehicle speed diagram whose principle corresponds to that of the diagram in FIG. 4. In addition, FIG. 10 shows several variations of the torque imposed on various components of the drivetrain 1 during a range change in the range transfer box 9 from "low" to "high". Furthermore in FIG. 11, several rotation speed variations of individual components of the drivetrain 1 of FIG. 1 during the range change in the range transfer box 9 are plotted as a function of shifting time t.

Below, a method for controlling the drivetrain 1 is described with reference to the diagrams shown in FIGS. 9 to 11, by means of which the range in the range transfer box 9 can be changed from "low" to "high" at any vehicle speed with a very short traction force interruption time.

Referring to FIG. 9, at a time T_0 the driver of the vehicle uses the selector switch 27 to select the transmission range "high" in the range transfer box 9, the latter being in "low" at the time. If the driver selects "low" when the range transfer box 9 is already in that condition, the driver's command is ignored by the control unit of the drivetrain 1.

When the driver's voluntary command is received by the control unit of the drivetrain 1, the control unit reduces the drive torque of the engine 2, as represented graphically by the variation of the E-Gas-Moment m_mot_e in FIG. 10.

By this reduction of the drive torque of the engine 2, the load on the drivetrain 1 is relieved and, at the same time, the torque m_24 at the first shift element 24 of the range transfer box 9 becomes zero. When the first shift element of the range transfer box 9 is completely unburdened, the first shift element 24 is disengaged, producing the neutral condition in the range transfer box 9. The first shift element 24, made as a claw clutch, is opened by an electric motor arranged in the range transfer box 9. The open condition of the first shift element 24 is now detected by a position sensor (not shown). A signal from this position sensor is processed in the control unit and shift elements of the automatic transmission 8 to be engaged, which are involved in a counter-shift in the automatic transmission corresponding to the shift condition in the range transfer box 9, are actuated by the control unit.

The advantages of the procedure that when the ratio of the range transfer box 9 is changed a corresponding counter-shift takes place in the automatic transmission 8 without any change of the vehicle speed v_fzg, are made clear in FIG. 9 by the arrows 28 and 29. When the range in the range transfer box 9 is changed from "low" to "high" while the ratio "A6" is engaged in the automatic transmission 8, if a counter-shift takes place in the automatic transmission 8 to ratio "A3", a connection speed of the engine 2 for the new gear-step of the multi-range transmission 4 differs from the engine speed n_mot in the initial ratio "A6L" of the multi-range transmission 4 considerably less than would be the case without the counter-shift in the automatic transmission 8.

The connection speed $n_{13}$ mot of the drive engine 2 which would exist without a corresponding counter-shift in the automatic transmission 8, is shown by the other arrow 29 in FIG. 9. This large speed change is disadvantageous for the driving behavior, since the equalization time during which the speed of the engine is adjusted to the new speed or connection speed, is much longer than with smaller speed differences. The disadvantage arises from the fact that, during this equalization times the drivetrain is not under load and the shift causes a traction force interruption which, in some circumstances, can make it impossible to drive any further on steep slopes.

After the unloading of the drivetrain 1 and thus also of the first shift element 24 of the range transfer box 9, the engine torque or E-Gas-Moment m_mot_e is kept constant and, during a subsequent control phase, it is then adjusted, as illustrated schematically in FIG. 10, in such manner that as a function of the torque m_mot and also the speed n_mot of the engine 2, synchronization of the second shift element 25 of the range transfer box 9 and of the shift elements in the automatic transmission 8 to be engaged in order to establish the new ratio in the automatic transmission 8 takes place.

Figure 11:
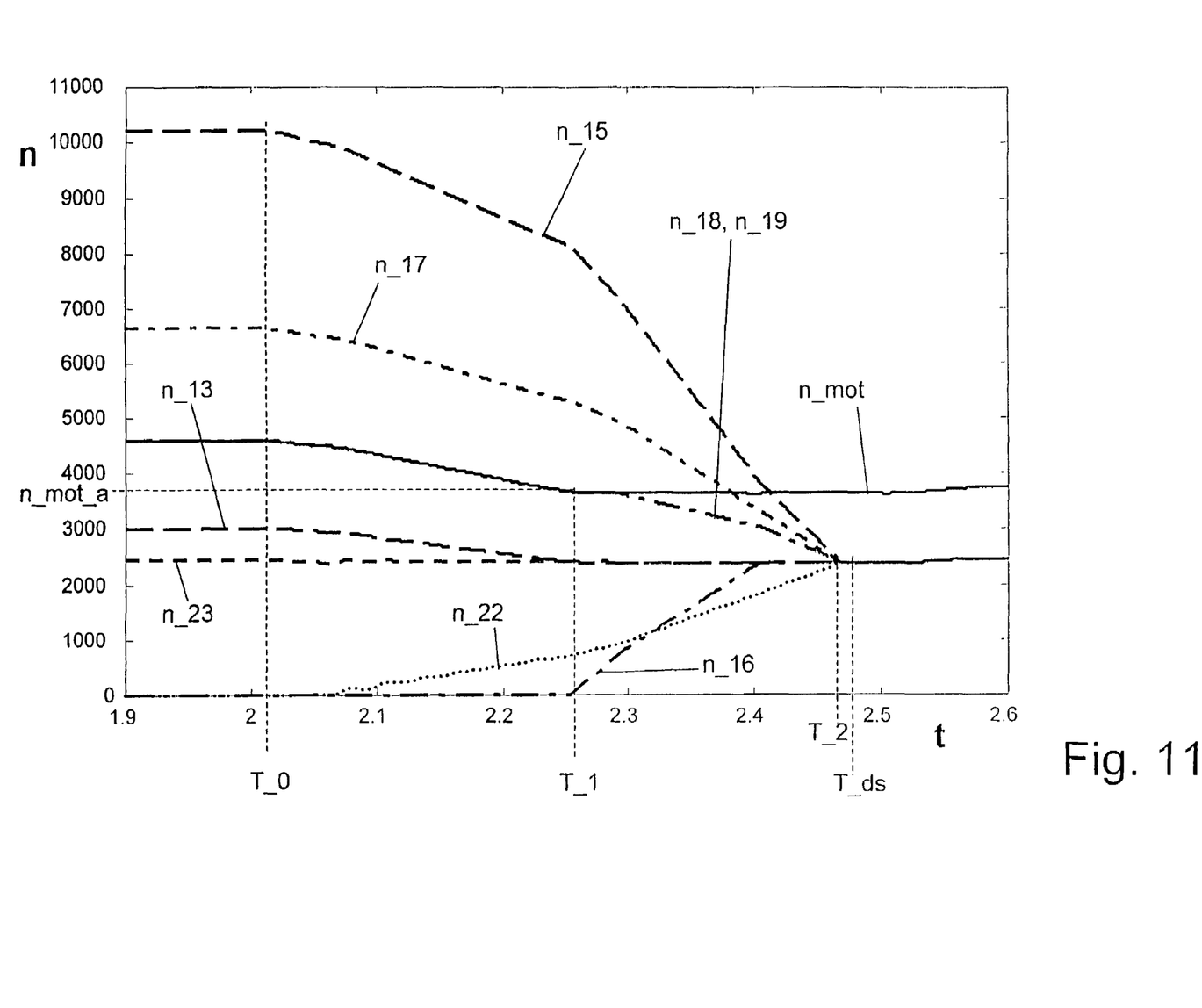
FIG. 11 are several speed variations of components of the multi-range transmission, which correspond to the torque variations of FIG. 10.

To the torque variations in FIG. 10 there correspond speed variations of the individual structural components of the drivetrain 1, which are shown in FIG. 11. At a time T_0 when the driver's wish to change the range in the range transfer box 9 from "low" to "high" is communicated via the selector switch 27, the shifting process in the multi-range transmission begins in accordance with the driver's wish, this process bringing about a change in the speeds or a change in the variations of the individual speeds of the structural elements of the drivetrain that are involved in the shifting process.

To change the drive speed n_mot of the engine 2 in the shortest possible time, from its speed in the gear of the multi-range transmission 4 in which it is at the time T_0 when the voluntary driver command is issued to the connection speed of the gear-step of the multi-range transmission 4 to be engaged, the transmitting capability of the shift elements of the automatic transmission 8 to be engaged and disengaged is adjusted in such manner that the rotation speed n mot of the drive engine 2 varies as shown in FIG. 11.

At time T_1 the speed n_mot of the engine 2 has reached the connection speed n_mot_a previously calculated in the control unit as a function of the "new" transmission ratio of the multi-range transmission 4 and the current vehicle speed v_fzg. Here, the vehicle speed v_fzg is determined by ABS sensors or other suitable vehicle devices (not shown) present in the vehicle.

The drive speed n_mot of the engine 2 can be equalized with the connection speed n_mot_a substantially more quickly by the procedure described above, than would be the case if adjustment were effected via the E-Gas-Moment alone. Thus, in the present case, the engine 2 is preferably braked by increasing the transmitting capability of the shift elements of the automatic transmission 8 to be engaged. The shift elements of the automatic transmission 8 to be engaged are operated in a so-termed slipping condition and brake the engine 2 to its corresponding connection speed in the shortest time. The shift elements of the automatic transmission to be engaged are actuated in such a manner that, via a controlled filling of the frictional shift elements, sufficient transmitting capability is provided.

At time T_2 the shift elements of the automatic transmission 8 to be engaged and the second shift element 25 of the range transfer box 9 are synchronous, so that the shift elements of the automatic transmission 8 to be engaged and the second shift element 25 can be closed, re-establishing the force flow from the engine 2 to the vehicle's drive output. At the same time, the shift elements of the automatic transmission 8 to be disengaged are opened and disassociated from the force flow of the drivetrain 1.

Another position sensor detects the engagement of the second shift element 25 made as a claw clutch and the drive torque of the engine 2, i.e., the E-Gas-Moment m_mot_e is then equalized with the required drive torque m_mot_f, so the vehicle continues driving with an appropriate drive input speed and with the required drive input torque of the engine 2.

The synchronization of the shift elements of the automatic transmission 8 and the range transfer box 9 that are involved in the shifting of the multi-range transmission 4, described above, is based on the rotation speed variations n_13, n_15, n_16, n_17, n_18, n_19, n_22 and n_23 shown in FIG. 11. The shifting phase in the multi-range transmission 4 begins at time T_0. Here, in contrast to the description relating to FIG. 6, the shifting process is not initiated automatically but takes place as the result of a driver's voluntary command. When the driver's voluntary command to engage the "low" range in the range transfer box 9 is issued, a transmitting capability of the shift elements of the automatic transmission is established such that the speeds n_13, n_15, n_18, n_19 and the drive speed n_mot are reduced. The speed n_13 of the planetary gear support 23 of the range transfer box 9 remains essentially unchanged.

In FIG. 10, the reduction of the drive torque n_mot brought about by reducing the E-Gas-Moment m_mot_e leads to unloading of the first shift element 24 of the range transfer box 9, so that it can be opened shortly after time T_0 and the speed n_22 of the annular gear wheel 22 of the range transfer box 9 slowly increases with shifting time toward the speed n_23 of the planetary gear support 23 of the range transfer box 9.

From the time T_1 when the drive speed n_mot of the engine 2 has reached the connection speed n_mot_a, the transmitting capability of the shift elements of the automatic transmission 8 is adjusted such that the speeds n_15, n_17, n_18 and n_19 are reduced still further and the speed n_16 of the second solar gear wheel 16 of the second planetary gear set 14 increases toward the speed n_23 of the planetary gear support 23 of the range transfer box 9.

At time T_2 the speeds n_15, n_16, n_17, n_18, n_19 and n_22 are equal to the speeds n_13 and n_23, so the shift elements of the automatic transmission 8 to be engaged and the second shift element 25 of the range transfer box 9 are synchronized and can be closed. At the time T_ds the shifting of the second shift element 25 of the range transfer box 9 is detected by a position sensor and the shifting operation of the multi-range transmission 4 is terminated.

The two example embodiments described above have the advantage that no mechanical synchronizations in the range transfer box are needed, so that drag torques and also the fuel consumption are reduced. In addition, the fact that mechanical synchronizations are not needed makes it possible to save weight, space and costs in the range transfer box made as a claw-shifted transmission aggregate.

Moreover, with the method according to the invention, the traction force interruption time during range changes in the range transfer box can be reduced considerably compared with conventional methods. In the example embodiment according to FIGS. 2 to 5, the range change in the range transfer box takes place automatically, which advantageously makes things easier for the driver.

With the version of the method according to the invention shown in FIGS. 6 to 10, the transmission range in the range transfer box can be changed by generating a driver's voluntary command to change the range in the range transfer box at any vehicle speed with a short traction force interruption time and at the same time, after the gear change in the multi-range transmission, the engine speed is adapted to the new transmission ratio of the multi-range transmission, which results in a considerable improvement of driving comfort and driving safety, especially on steep slopes.

REFERENCE NUMERALS

1 Drivetrain
2 Drive engine
3 Starting element
4 Multi-range transmission
5 Output shaft
6 Hydrodynamic torque converter
7 Controlled converter clutch
8 Automatic transmission
9 Range transfer box
10 First planetary gear set
11 Annular gear wheel of the first planetary gear set
12 Solar gear wheel of the first planetary gear set
13 Planetary gear support of the first planetary gear set
14 Second planetary gear set
15 First solar gear wheel of the second planetary gear set
16 Second solar gear wheel of the second planetary gear set
17 Common annular gear wheel of the second planetary gear set
18 First planetary gear support of the second planetary gear set
19 Second planetary gear support of the second planetary gear set
20 Transmission housing
20A Transmission housing of the range transfer box
21 Solar gear wheel of the range transfer box
22 Annular gear wheel of the range transfer box
23 Planetary gear support of the range transfer box
24 First shift element of the range transfer box
25 Second shift element of the range transfer box
26 Automatic transmission selector lever
27 Selector switch
28 Arrow
29 Arrow
30 Circle
A-E Shift elements of the automatic transmission
"D" Drive, forward drive
"A1"-"A6" Transmission ratios of the automatic transmission
H "High" range of the range transfer box
L "Low" range of the range transfer box
m Torque
m_mot_e E-Gas-Moment
m_mot_f Driver-specified torque
m_24 Variation of the torque of the first shift element of the range transfer box
m_25 Variation of the torque of the second shift element of the range transfer box
n Rotation speed
"N" Neutral
n_mot Drive input speed of the engine
n_mot_a Connection speed
"O" Off-road, forward drive
"P" Park
"R" Reverse drive
"t" Shifting time
"T" Time point
T_ds Shift time point
v_fzg Vehicle speed
I-III Transmission ratio of the multi-range transmission
III-L Transmission ratio of the multi-range transmission
III-H Transmission ratio of the multi-range transmission
IV-VIII Transmission ratio of the multi-range transmission

The invention claimed is:

1. A method for controlling a drivetrain (1) in a vehicle, with a drive engine (2), a multi-range transmission (4) and a drive output, the multi-range transmission (4) consisting at least of an automatic transmission (8) and a downstream range transfer box (9) that can be shifted by means of shift elements (24, 25), when a transmission range of the range transfer box (9) is changed, a first shift element (24 or 25) of the range transfer box (9) that is to be engaged is synchronized by controlling shift elements (A to E) of the automatic transmission (8), such that the range change in the range transfer box can be, one of, carried out automatically or by generation of a voluntary drivers command at any vehicle speed; wherein a rotation speed (n_mot) of the drive engine is changed toward a connection speed (n_mot_a) of a ratio to be produced in the multi-range transmission, at which the shift element of the range transfer box to be engaged is synchronized; and reducing a transmitting capability of shift elements of the automatic transmission (8) in order to adjust the connection speed (n_mot_a) of the engine (2) and when the connection speed (n_mot_a) of the drive engine (2) is established, causing the transmitting capability of the shift elements of the automatic transmission (8) to be disengaged, while operating shift elements to be engaged of a ratio in the automatic transmission (8) in a slipping condition.

2. The method according to claim 1, wherein when the transmission range of the range transfer box (9) is changed, a transmission ratio of the automatic transmission (8) is changed in such manner that a ratio change of the multi-range transmission (4) is smaller than if the range of the range transfer box (9) alone had been changed.

3. The method according to claim 1, wherein a range change takes place in the range transfer box (9) in response to the voluntary driver command.

4. The method according to claim 1, wherein before the range of the range transfer box (9) is changed, a load on the drivetrain (1) is relieved by changing a torque (m_mot) of the drive engine (2).

5. The method according to claim 1, wherein the connection speed (n_mot_a) of the drive engine (2) is determined as a function of a transmission ratio to be engaged in the multi-range transmission (4) and of a vehicle speed (v_fzg), so that when the connection speed (n_mot_a) is reached an input speed on an engine side and an input speed of the shift element (24 or 25) of the range transfer box (9) to be engaged on an output side are equal.

6. The method according to claim 1, wherein the shift elements (A to E) of the automatic transmission (8) are actuated in such manner as to adjust the connection speed (n_mot_a) of the drive engine (2).

7. The method according to claim 1, wherein the shift elements of the automatic transmission (8) and of the range transfer box (9) to be engaged are dosed when In a synchronized condition.

8. The method according to claim 1, wherein the change of range in the range transfer box (9) and an associated ratio change in the automatic transmission (8) are carried out when a voluntary driver command has been used.

9. The method according to claim 1, wherein a change of ratio in the range transfer box (9) and an associated ratio change in the automatic transmission (8) take place automatically when a defined operating condition exists.

10. The method according to claim 1, wherein a ratio change in the automatic transmission (8) is matched to the range change in the range transfer box (9) in such manner that essentially no change occurs in a transmission ratio of the multi-range transmission.

11. A method for controlling a drivetrain (1) in a vehicle with a drive engine (2), a multi-range transmission (4) and a drive output, the multi-range transmission (4) consisting at least of an automatic transmission (8) and a downstream range transfer box (9), the method comprising the steps of:

shifting the downstream range transfer box (9) by means of shift elements (24, 25), when a transmission range of the range transfer box (9) is changed;

synchronizing a first shift element (24 or 25) of the range transfer box (9) that is to be engaged by controlling shift elements (A to E) of the automatic transmission (8), such that a range change in the range transfer box can be carried out at any vehicle speed; and maintaining a first transmission ratio at substantially the same value as a second transmission ratio during the range change in the range transfer box (9) between a high and a low range of the range transfer box (9).

12. The method for controlling a drivetrain (1) in a vehicle as set forth in claim 11 further comprising the steps of ensuring that a connection value of the rotation speed of the drive engine (2) for the second transmission ratio of the multi-range transmission remains essentially the same as a connection value for the first transmission ratio during the range change in the range transfer box (9) between the high and the low range of the range transfer box (9).

13. The method for controlling a drivetrain (1) in a vehicle as set forth in claim 11 further comprising the steps of synchronizing the shift elements of the range transfer box (9) with the automatic transmission (8) independently of engine speed.

* * * * *